United States Patent Office 2,761,782
Patented Sept. 4, 1956

2,761,782
LOW-ADHESION SILICONE-CONTAINING CHEWING GUM

Norris C. Leonard, Nashville, Tenn.

No Drawing. Application April 9, 1953,
Serial No. 347,821

10 Claims. (Cl. 99—135)

This invention relates to a low-adhesion silicone-containing chewing gum.

More particularly the invention relates to a chewing gum of the conventional chicle or gum-base type having a quantity of silicones of the "mold-release" water-repellent type added thereto in addition to, or as a partial or full substitute for, the heretofore customarily added "softeners." Specifically, the invention contemplates modifying existing gum-base chewing-gum formulas by adding thereto, in widely varying amounts, quantities of one or more dimethyl polysiloxanes, as described in Dr. R. R. McGregor's textbook "Silicones and Their Uses," McGraw-Hill, 1954, popularly known as "Dow Corning 200 Fluids," either as a partial or full substitute for the long-sought conventional softening agents or in addition thereto, for the purpose of preventing rapid loss of flavor, and decreasing their objectionable adhesiveness, and particularly their adhesiveness to plastic dentures, and to orthodontic devices (which are frequently displaced by ordinary chewing gum).

Dentists and dental technicians are frequently called upon to remove chewing gum from plastic dentures. This bothersome operation is the result of the extremely strong adhesiveness of conventional chewing gums relative to plastic dentures. Many persons who enjoy and/or would be physiologically benefited by the use of chewing gum have had to forego its use for this reason. Conventional chewing gum is also objectionable because of its strong adhesiveness to shoes, floors, fabrics, paper, etc., as is well known to parents and to persons charged with the maintenance and cleaning of public places. The present invention very simply and effectively overcomes these objectionable characteristics of conventional chewing gums.

It is accordingly an object of this invention to provide a gum-base chewing gum that is non-adhesive to plastic dentures.

It is a further object to provide a gum-base or chicle-type chewing gum having as one ingredient thereof one or a mixture of dimethyl polysiloxanes or "Dow Corning 200 Fluids" to decrease the general adhesiveness thereof.

One composition tested comprised cooked chicle, sugar, flavoring and a softening agent, such as glycerine, which were present in amounts corresponding to conventional chewing gum, said combined substances being combined with "Dow Corning 200 Fluid, Viscosity Grade 100,000" in such proportions that the latter constituted between 1% and 40% of the final product. The adhesiveness of the product was noticeably reduced by any amount of the added material, especially when tested by wearers of plastic dentures.

A second composition tested comprised a widely distributed and nationally advertised stick chewing gum having spread thereon a jelly-like silicone substance, "Dow Corning 4," which is said to be a "Dow Corning 200 Fluid" with an added "silica filler," as described in Dr. R. R. McGregor's "Silicones and Their Uses," McGraw-Hill, 1954. The amount of the added silicone substance did not seem to be critical, but even in amounts approaching half of the stick in volume, produced a gum very much like the original stick in taste, consistency and feel, but markedly less adhesive to paper, wood, fabrics, and especially plastic dentures. These results were also observed when the additive was that of the first-described composition.

On the basis of the few experimental compositions tested it cannot be theorized whether the decreased adhesiveness to objects in general, or to plastic dentures in particular, is due to surface-tension changes, better wetting action, water-retention (water-proofing effect), or the factors that make silicones of this type usable as "mold-release" substances, and/or to other unknown or unmentioned factors.

Having thus described my invention, what I claim as new and desire to secure by Letters Patent of the United States is:

1. A chewing gum, comprising: a gum base, flavoring substances, and an adhesion-reducing silicone additive consisting essentially of material selected from the group of dimethyl polysiloxanes, popularly known as "Dow Corning 200 Fluids."

2. A chewing gum according to claim 1 and in which said silicone additive is present in an amount less than fifty percent by weight of the complete product.

3. A chewing gum according to claim 1 and in which said silicone additive is present in an amount in excess of one percent, but less than fifty percent.

4. A chewing gum according to claim 1 and in which said silicone additive has a viscosity at 25° C. of between 12,500 and 100,000 centistokes.

5. A chewing gum, comprising: a gum base, flavoring substance, and a silicone material of the type designated dimethyl polysiloxanes added thereto to appreciably reduce the adhesiveness of the resultant product.

6. A chewing gum according to claim 5 and in which said silicone material comprises a "Dow Corning 200 Fluid" as an essential ingredient thereof.

7. A chewing gum according to claim 6, said material being "Dow Corning 4."

8. A chewing gum, comprising: a gum base, flavoring substance, and a dimethyl polysiloxane added thereto to reduce the adhesiveness thereof.

9. A chewing gum according to claim 8 and in which said dimethyl polysiloxane is present in an amount less than 25% of the complete product.

10. A chewing gum, comprising: a gum base, flavoring substance, and a substantially water-insoluble dimethyl polysiloxane, liquid at room temperature, added thereto to reduce the adhesiveness thereof.

References Cited in the file of this patent

UNITED STATES PATENTS

| | | |
|---|---|---|
| 2,525,072 | Kearby | Oct. 10, 1950 |
| 2,606,510 | Collings | Aug. 12, 1952 |
| 2,606,837 | Clark | Aug. 12, 1952 |